April 7, 1970 A. L. M. FETTWEIS ET AL 3,505,477

IMPEDANCE NETWORK FOR RESONANT TRANSFER MULTIPLEXING

Filed March 20, 1967 3 Sheets-Sheet 1

3,505,477
IMPEDANCE NETWORK FOR RESONANT TRANSFER MULTIPLEXING

Alfred Leo Maria Fettweis, Mol, Joseph Antonius Broux, Antwerp, Charles Gerard Cornelius Cool, Comines, and Robert Pierre Emile Ferdinand Salade, Antwerp, Belgium, assignors to International Standard Electric Corporation Filed Mar. 20, 1967, Ser. No. 624,530
Claims priority, application Netherlands, Mar. 21, 1966, 6603699
Int. Cl. H04j 3/08
U.S. Cl. 179—15 9 Claims

ABSTRACT OF THE DISCLOSURE

Resonant transfer systems which incorporate the low inductance coupling transformer and the D.C. blocking capacittor into a bandpass filter to replace the low pass filter used to convert the pulse amplitude modulated energy into the voice frequency band.

Figure 1:
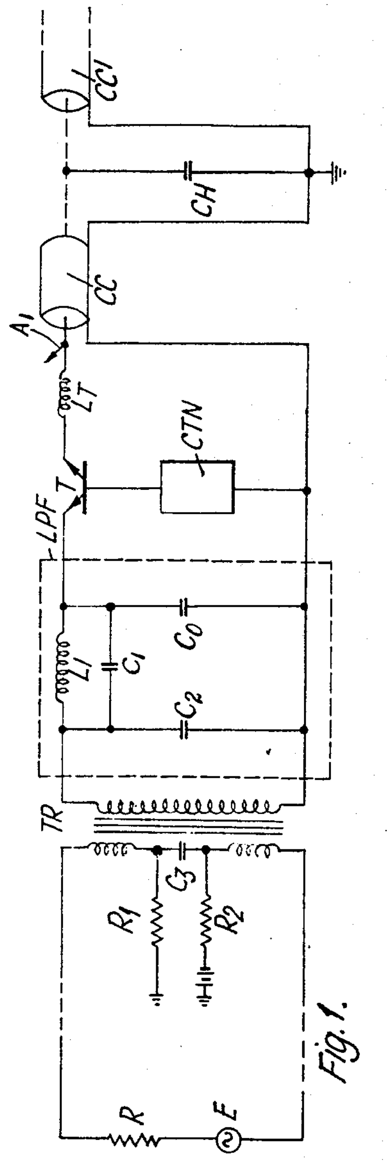

The invention relates to an impedance network for an electrical transmission system wherein signals are transmitted by means of pulses repeated at a sampling frequency, said impedance network being coupled on one side to a resistive termination through coupled inductances and on the other side to a gate regularly unblocked at said frequency.

Such an impedance network is disclosed in the U.S. Patent No. 3,187,101. An impedance network of this kind is essentially composed of reactive elements constituting a low pass filter to be used in a time division multiplex system wherein it serves to convert the pulse amplitude modulated energy into the voice frequency band. In a time division multiplex system, it is usually desirable to operate the pulse system on an unbalanced basis, this in order to avoid a duplication of the gates involved in such systems. On the other hand, the subscriber lines and other terminations, such as junctions, are balanced circuits whereby it is essential to provide a transformer between the low pass filter and the balanced line. At least one other reason why such a transformer is essential is that the control circuits for the transistors which are used as gates must be isolated from the external accesses. As disclosed in the above U.S. patent, a step-up ratio from the balanced line to the unbalanced low pass filter is desirable in order to raise the impedance level of the filter so that the switching current through the gating transistor may be limited, the step-up ratio being however chosen low enough so that the voltage applied to this gating transistor will not exceed the limits thereof.

Such a system as above is particularly useful when applying the resonant transfer principle disclosed in the U.S. Patent No. 2,718,621. According to this principle, seen from the electronic gate, the low pass filter offers a capacitive impedance at infinite frequency and a small inductance is inserted in series with the transistor gate with such a value that it resonates with the equivalent capacitance of the low pass filter, at a frequency such that the corresponding half period is equal to the time during which the transistor gate is unblocked, this time being only a small fraction of the sampling period. In this way, when two such low frequency circuits are interconnected through their respective gates, and eventually through additional switching gates, such as disclosed in the U.S. Patent No. 3,204,033, a theoretically perfect exchange of energy can take place between the equivalent storage capacitances of the two low pass filters and a practically lossless transmission can be obtained.

Nevertheless, it is clear that this is only an ideal situation and in practice some limited losses will still be encoutnered which it is the designer's task to eliminate in so far as possible and in general produce a satisfactory transmission characteristic compatible with the requirements of modern telecommunication systems. A proposed low pass filter has for instance been disclosed in the U.S. Patent No. 3,100,820. While this shows a particular design for a specific low pass structure, the French Patent No. 1,348,372 discloses a general method for improving filters design for resonant transfer, by adding extra reactive elements on the high frequency side of filters normally designed on an open-circuit basis. Such prior filter designs do not however disclose associated coupling transformers in order to connect such unbalanced filters to balanced lines.

Ideally, this transformer should not modify the response of the optimized filter. However, while ideal transformers are useful devices for the analysis of transmission networks, in practice one has to contend with ordinary transformers which inevitably introduce spurious elements in the transmission path since their shunt inductance is not ideally infinite and their leakage inductance is different from zero. In order to limit the additional loss caused by the finite value of this shunt inductance, it should have such a value that at the minimum frequency to be transmitted, its reactance should be at least equal to three times the terminating resistance on the corresponding side of the transformer and obviously, the larger it is, the lower will be the additional loss, especially at the lower end of the passband.

An additional requirement in telephone systems is that usually D.C. current must flow through the transformer in order to feed the carbon microphone of the subscriber set. In view of this current which may be of the order of 20 milliamperes, an airgap must be provided in the transformer and this increases the number of turns thereof. Consequently, the resistance of the winding will also be raised and even if the shunt inductance of the transformer is high enough, this dissipating element will then be responsible for the greatest part of the losses in the time division multiplex connection.

Additionally, the microphone current supply must be decoupled from the speech path with the help of a capacitor, usually of 2 microfarads, and in order to keep a balanced line circuit, the primary winding of the transformer on the line side is split to enable the insertion of this capacitor. The latter constitutes a second disturbing element since it cannot be made of sufficiently high value not to adversely affect the transmission characteristics.

The general object of the invention is to obtain an improved electrical transmission system of the type discussed above in which the spurious effects of such elements are eliminated. The invention is based on the insight that unexpectedly, instead of using larger values for such elements as the line transformer and the splitting capacitor much smaller values than those usually taken as minima by the designer may be found to result in a vary substantially improved transmission characteristic.

In accordance with the main characteristics of the invention, an impedance network as initially defined is characterised in that said coupled inductances constitute a shunt inductive impedance in the transmission path whose value at the lowest frequency to be transmitted and when measured on the side of said resistive termination is lower than three times the impedance of said resistive termination. In accordance with another characteristic of the invention, said coupled inductance on the side of said resistive termination is coupled thereto through a series capacitance.

In accordance with a further characteristic of the invention, said coupled inductances with the series capacitance connected on the side of the resistive termination and said impedance network together constitute a band-pass filter.

Thus, it has now been found possible to integrate the transformer and the D.C. splitting capacitor in the filter design so that instead of a low pass filter being unfavourably affected by spurious elements, a band-pass filter of adequate characteristics may initially designed.

In accordance with yet a further characteristic of the invention, said band-pass filter is antimetrical, i.e., having inverse image impedances.

Such a structure can be found to make possible the inclusion of a practical transformer and a splitting capacitor in the design, while securing an adequately low value for the shunt inductance corresponding to the transformer so that the reduced value of the winding resistances means a much lower attenuation in the pass-band. A symmetrical band-pass filter on the other hand could not take into account the leakage inductance of the practical transformer nor the D.C. splitting capacitor and moreover, a computation of such a symmetrical band-pass filter leads to an equivalent shunt inductance whose value is more than 10 times that of the shunt inductance secured with an antimetrical design.

Figure 2:
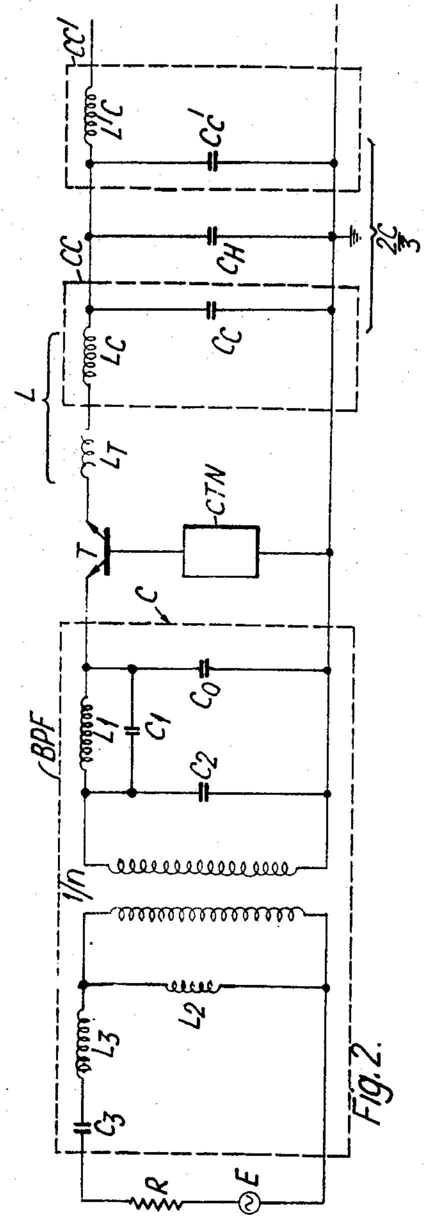
Figure 3:
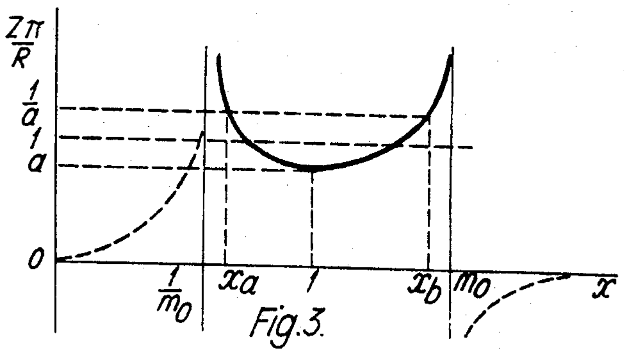
Figure 4:
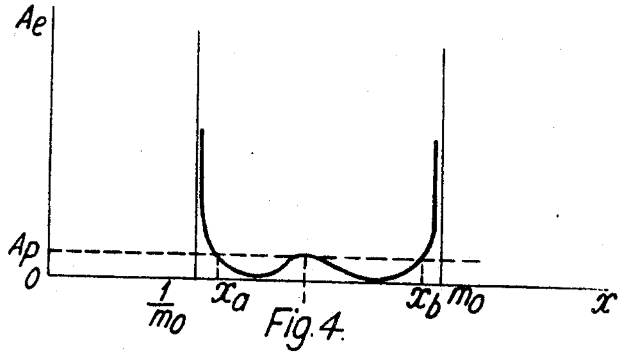
Figure 5:
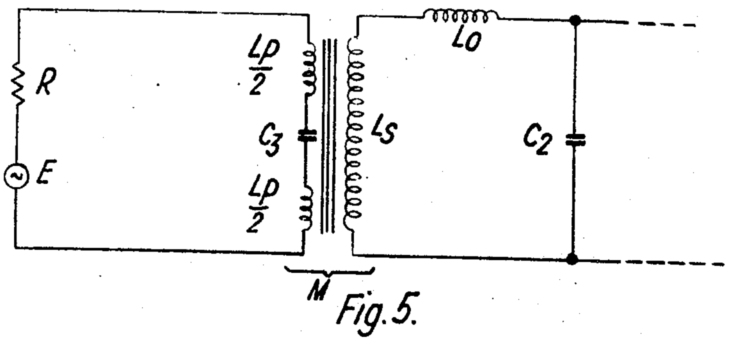

The above and other objects and characteristics of the invention and the best manner of attaining them as well as the invention itself will be better understood from the following description of embodiments thereof to be read in conjunction with the accompanying drawings which represent:

FIG. 1, part of a time division multiplex resonant transfer transmission system as disclosed in the U.S. Patent No. 3,187,101;

FIG. 2, the electrical transmission network of the instant invention;

FIG. 3, the image impedance function of a band-pass filter;

FIG. 4, the envelope characteristic of the attenuation function of the pass-band filter within the pass-band;

FIG. 5, a particular design of part of the circuit of FIG. 2; and

Figure 6:
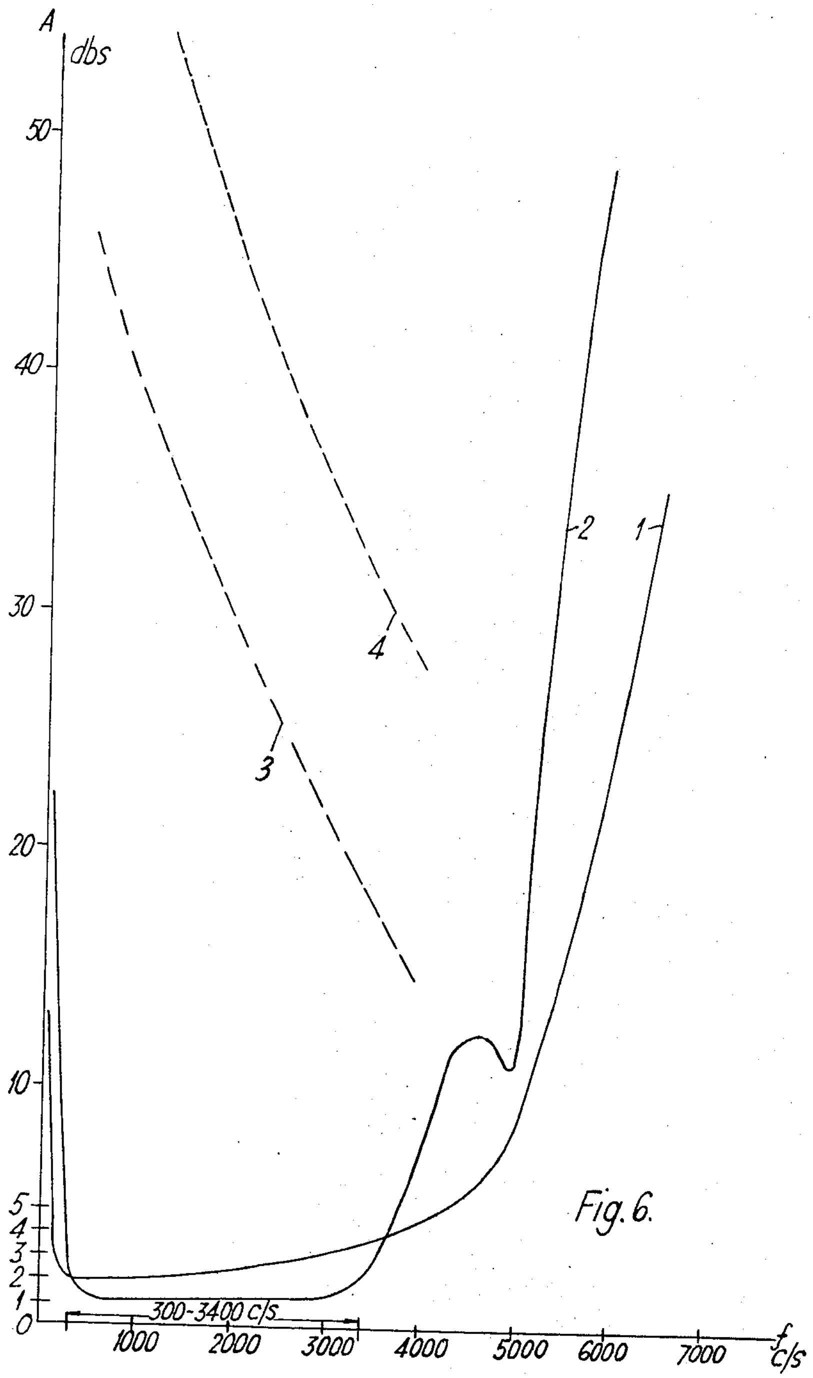

FIG. 6, an attenuation curve showing the improvements obtained by the filter designed in accordance with the present invention.

Referring to FIG. 1, the latter shows a time division multiplex resonant transfer transmission circuit of the type disclosed in the U.S. Patent No. 3,187,101 previously mentioned. A telephone substation represented by a source of electrical signals E and a source resistance R may be connected by a balanced transmission line to a line transformer TR whose split primary windings are interconnected by a D.C. splitting capacitor $C_3$ whose plates are coupled to ground and negative battery through resistances $R_1$ and $R_2$ respectively, through which resistances can flow the D.C. current needed by the carbon microphone (not shown) at the substation. Call detecting elements may be coupled at the junction of $R_2$ and $C_3$ and are not shown here as they have no bearing on the invention. The secondary side of TR is unbalanced, one end of the winding being coupled to a central ground through the outer conductor of a coaxial cable CC which constitutes a common highway used by a group of e.g. 100 substations in time division multiplex fashion as indicated by the multiplying arrow A. The coupling from the live terminal of the secondary winding TR to the central conductor of CC is made through the low pass filter LPF comprising the shunt capacitors $C_0$ and $C_2$ together with the anti-resonant series circuit made of inductance $L_1$ and capacitor $C_1$. On the side away from TR, LPF is coupled to the inner conductor of the CC through the emitter path of a PNP transistor T serving as electronic gate in series with a small inductance $L_T$ constituting the resonant transfer inductance. The base of T is shown to be coupled to the ground conductor through control network CTN which will not be further described as it may for instance be of the type disclosed in the above mentioned U.S. Patent No. 3,187,101 and it serves to regularly unblock transistor T, say during time intervals of two microseconds out of a channel time of four microseconds and at a sampling frequency of 10 kc./s. corresponding to a sampling period of 100 microseconds. This 100 microsecond period is large with respect to the time during which the connection is established.

Away from the subscriber side, the coaxial conductor CC may be coupled through a further gating transistor not shown to a central capacitance CH which in turn may be connected through exactly identical circuits to another substation in the network, e.g. through the coaxial conductor CC′ serving as highway for the group of that second substation (not shown).

FIG. 2 shows a circuit which serves to explain the transmission properties of the network of the present invention. In FIG. 2, transformer TR has been replaced by the shunt inductance $L_2$, the series inductance $L_3$ and which corresponds to the leakage inductance of the transformer, the third element thereof being the ideal transformer of voltage step-up ratio $1/n$ which is inserted between shunt inductance $L_2$ and shunt capacitance $C_2$. The feeding resistances $R_1$ and $R_2$ of FIG. 1 play no part in the transmission properties and accordingly have been omitted from FIG. 2 wherein capacitance $C_3$ is shown in series between $L_3$ and R.

Further, the coaxial cable CC and CC′ shown in FIG. 1 have been represented in FIG. 2 by simplified circuits each consisting of a series inductance such as LC and a shunt capacitance CC, the first being added in series with LT to constitute the overall resonant transfer inductance L, and the second being added in shunt across capacitance CH together with the like shunt capacitance C′C of the other coaxial cable CC′, to form an overall central shunt capacitance which is adjusted with the help of CH to a value $2C/3$.

For resonant transfer operation, looking into the filter from the transistor T, since the transfer occurs at high frequency, such an element as $L_1$ and elements $C_2$, $C_3$, $L_2$ and $L_3$ may be disregarded so that the impedance seen is a capacitance C formed by $C_0$, $C_1$ and $C_2$. By adjusting the value of L to secure resonant transfer operation and by also adjusting the central capacitance to the value $2C/3$ in order to secure harmonic resonant transfer operation as disclosed in the French patent of addition No. 72,050 perfect energy exchanges between the storage capacitances C of the two interconnected lines may be secured. This means that at the end of a resonant transfer interval the energy in C will have been transferred to the corresponding capacitance at the other side (not shown) of the connection and vice-versa. In practice, there is some residual energy left in the highway capacitances and this is cleared away, during the guard times separating the channel time slots, by clamping, i.e. short-circuiting through a resistance. This may be done (not shown) not only for the capacitance between the inner and outer coaxial conductors at both ends of the coaxial cables such as CC, but also, on the side of LT, between these conductors and the central ground. The step-up ratio $1/n$ is useful in order to be able to use a relatively higher impedance level for such elements as $C_0$, $C_1$ and $C_2$ constituting the storage capacitance C, since the current flowing through transistor T is directly proportional to $$\sqrt{\frac{C}{L}}$$

and cannot exceed a prescribed value. On the other hand, $n$ should not be too large with respect to unity as otherwise the voltage applied to the transistor T would also exceed the allowable value.

It is known, e.g. from the previously mentioned French Patent No. 1,348,372, that the low pass filter LPF of FIG. 1 may be designed on an open-circuit basis by classical methods since transistor T is only made conductive during a very short part of the sampling period. It will now be shown that the network BPF of FIG. 2 incorporating the transformer TR and the capacitor $C_3$ of FIG. 1 constitutes a suitable band-pass filter of the antimetrical type which may be designed in a suitable manner, for instance by using image impedance theory.

The image impedance of the band-pass filter considered here is one of the lowest class and particularly the $Z\pi$ type of image impedance or its inverse of the ZT type considered for instance in the Belgian Patent No. 624,163 or in Revue HF, 1963, No. 11, "Image parameter and effective loss design of symmetrical and antimetrical crystal band-pass filters," A. Fettweis, which are given by:

$$\frac{Z\pi}{R}=\frac{R}{ZT}=\frac{abx}{\sqrt{\left(x^2-\frac{1}{m_o^2}\right)(m_o^2-x^2)}} \quad (1)$$

expressing then as impedances normalized with respect the resistance, R. In the above formula, $x$ is a normalized frequency variable given by $$x=\frac{f}{f_m} \quad (2)$$

wherein $f$ is the frequency and $f_m$ the mid-band frequency of the band-pass filter which is equal to the geometric mean of the theoretical lower and upper cut-off frequency $f_a$ and $f_b$ respectively, $m_o$ being a dimensionless parameter defined by $$m_o=\frac{f_b}{f_m}=\frac{f_m}{f_a} \quad (3)$$

and $b$ being the relative bandwidth, i.e.

$$b=m_o-\frac{1}{m_o} \quad (4)$$

It can be appreciated from (1) that $a$ is the minimum value of the normalized $Z\pi/R$ image impedance which is obtained when $x$ is equal to unity as shown on FIG. 3.

The filter such as BPF shown in FIG. 2 should be designed as open-circuit filter by virtue of its being used in a time division multiplex transmission network using the gating transistor T and as already pointed out in the Belgian Patent No. 606,649 in connection with an improved design considering resonant transfer operation. The design of an open-circuit filter, i.e. terminated by a resistance such as R on one side but with an open-circuit on the other side, can be considerably simplified by using the technique of the reference filter described in the IRE Transactions on Circuit Theory, vol. CT5, December 1958, pp. 236–252, "Recent developments in filter theory," V. Belevitch. The reference filter is a filter conventionally terminated on both sides and with an effective transfer function equal to the voltage transfer function of the open-circuit filter. Simple relations can then be shown to exist between the image impedances of the two filters and the open-circuit filter may thus be realized by known synthesis methods. An open-circuit filter may be designed in this way from the reference filter as a ladder structure which may be called the intermediate filter because it has a last series branch on the open-circuit side, i.e. on the side of T (FIG. 2), which obviously can be suppressed to finally reach the open-circuit filter design whose structure thus ends with a shunt branch, i.e. $C_0$, on the open-circuit side.

It should be noted here that the series branch added on that side in accordance with the disclosure of the Belgian Patent No. 606,649 proceeds from different considerations and more precisely it may be regarded as a kind of correction network for the case of resonant transfer operation having some analogy with the $m$-derivation technique in classical image impedance filter theory. This is a separate and distinct improvemnt which is not considered here.

From the design of open-circuit filters discussed above, it is also known that within the passband the effective attenuation A is always comprised between two so-called envelopes, curves which in general are defined in terms of the normalized image impedance. In the particular cases of symmetrical filters, i.e. with equal image impedance, or antimetrical filters, i.e. with inverse image impedances, one or the other of these envelopes becomes 0 at all frequencies within the passband. In the case of an antimetrical filter, the attenuation A within the passband always lies between 0 and a maximum value given by $$A_e=\log\frac{1}{2}\left(\frac{Z\pi}{R}+\frac{R}{Z\pi}\right) \quad (5)$$

which is plotted in FIG. 4, also in terms of $x$ in view of (1).

FIG. 4 shows that just a $Z\pi/R$, plotted as a full line in the passband (real) and in dotted lines outside (imaginary) in FIG. 3, exhibits a minimum for $x=1$, i.e. at mid-band frequency, $A_e$ shows a peak at that point defined by $$A_p=\log\frac{1}{2}\left(a+\frac{1}{a}\right) \quad (6)$$

The theoretical cut-off frequencies have been defined as $1/m_o$ and $m_o$, i.e. Equation 3, on a normalized frequency scale and the normalized frequencies $x_a$ and $x_b$ indicated in FIGS. 3 and 4 as somewhat above and below the lower and upper theoretical cut-off frequencies $1/m_o$ and $m_o$ respectively are seen to correspond to frequencies for which the envelope attenuation $A_e$ is equal to the peak value $A_p$ obtained for $x=1$. These frequencies $x_a$ and $x_b$ will be defined as the practical lower and upper cut-off frequencies. The attenuation $A_P$ may thus be identified with the maximum attenuation allowable in the passband while $x_a$ and $x_b$ will correspond to the practical cut-off frequencies given to the designer. Naturally, since FIG. 4 gives the envelope $A_e$, i.e. an upper bound, of A, at $x_a$ and $x_b$ the attenuation may be smaller than $A_P$. The values $x_a$ and $x_b$ are thus determined by equating (5) with (6) which, by using (1), gives:

$$a+\frac{1}{a}=\frac{abx}{\sqrt{\left(x^2-\frac{1}{m_o^2}\right)(m_o^2-x^2)}}+\frac{\sqrt{\left(x^2-\frac{1}{m_o^2}\right)(m_o^2-x^2)}}{abx} \quad (7)$$

This equation is of course solved by $x=1$ as already pointed out in connection with FIG. 3. In that case, the first term in (7) dependent on $x$ is equal to $a$ and the second is equal to $1/a$. The values $x_a$ and $x_b$ on the other hand will lead to the first term being equal to $1/a$ and the second to $a$.

Thus $x^2_a$ and $x^2_b$ are the roots of a quadratic equation in $x^2$ and their sum and product are expressed by the relations $$x^2_a x^2_b=1 \quad (8)$$

$$x^2_a+x^2_b=m_o^2+\frac{1}{m_o^2}-a^4b^2=b^2(1-a^4)+2 \quad (9)$$

the first showing that the product of the practical cut-off frequencies is equal to $f^2_m$, the square of the midband frequency, or to the product $f_a f_b$ of the theoretical cut off frequencies, and the second giving $b$ and $m_o$ by using (4), in terms of $x_a$ and $x_b$ since it is the practical cut-off frequency values $x_a f_m$ and $x_b f_m$ which will be supplied to the designer.

The band-pass filter having the structure of BPF in FIG. 2 can be shown to be an antimetrical band-pass filter exhibiting an attenuation pole at $f_1$ above the upper cut-off frequency and which is desirable in order to attenuate the sampling frequency.

The design values can be secured along the conventional lines already explained and can be expressed in terms of the parameters $a$, $b$ and $m_o$ already defined as well as in terms of a further dimensionless parameter $m_1$ function of the infinite attenuation frequency $f_1$, i.e.

$$m_1=\sqrt{\frac{f_1^2-m_o^2f_m^2}{m_o^2f_1^2-f_m^2}} \quad (10)$$

The elements $C_3$, $L_3$ and $L_2$ can be expressed by $$C_3=\frac{ab}{\pi f_m R} \quad (11)$$

$$L_3=\frac{R}{4\pi ab f_m} \quad (12)$$

$$L_2=\frac{R}{4\pi a f_m}\frac{N_1}{(m_o+m_1)^2} \quad (13)$$

wherein $N_1$ is an auxiliary parameter given by $$N_1=a^2(m_o+m_1)^2+m_o^2+m_1^2 \quad (14)$$

The remaining four elements of BPF involve the step-up ratio $n$ of the ideal transformer because, for such an antimetrical bandpass basis, the ideal transformer is usually located at the open end of the structure, i.e. between $C_0$ and T, and not next to $L_2$ as shown in FIG. 2 to enable its incorporation, together with $L_2$, $L_3$ into a practical inductive coupling. Capacitor $C_2$ is given by $$C_2=\frac{a}{\pi bn^2f_mR}\frac{1+m_om_1}{m_o+m_1}\left[\frac{(m_o+m_1)(1-m_om_1)}{N_1}+\frac{bm_1(1+m_o^2)}{N_2}\right] \quad (15)$$

wherein $N_2$ is a second auxiliary parameter given by $$N_2=a^2(m_o+m_1)(1+m_om_1)+m_1(1+m_o^2) \quad (16)$$

The remaining elements are given indirectly by $$C_0+C_2=\frac{a}{\pi bn^2f_mR}\frac{(m_o+m_1)^2+(1+m_om_1)^2+2b^2m_om_1}{N_1}-\frac{N_3}{N_1^2}(m_o+m_1)^2 \quad (17)$$

$$\frac{C_1}{C_0}=\frac{1-m_o^2m_1^2}{2m_om_1b}\frac{N_1}{N_2} \quad (18)$$

$$L_1C_1=\frac{1-m_o^2m_1^2}{4\pi^2f_m^2(m_o^2-m_1^2)} \quad (19)$$

wherein $N_3$ is a third auxiliary parameter given by $$N_3=a^2(1+m_om_1)^2+1+m_o^2m_1^2 \quad (20)$$

Finally, the step-up ratio $n$ is given by $$n=\frac{4a(m_o^2-m_1^2)}{N_1} \quad (21)$$

This would normally have only half this value and in practice it would then be close to unity, but apart from the ideal transformer part of the antimetrical band-pass filter design, it is desirable to consider a further step-up ideal transformer before reaching the transistor gate T.

The reason is that the peak current flowing through the transistor T during the resonant transfers should usually be limited to some acceptable value. With an harmonic resonant transfer, this current which is proportional to $$\sqrt{\frac{C}{L}}$$

reaches a peak after one third of the transfer time, during which T is unblocked, has been reached. Hence, it is desirable to choose C as low as possible. But C corresponds to the capacitance seen into BPF from T at infinite frequency since the resonant transfer time is very short, e.g. two microseconds. Thus, the impedance seen into BPF, from the resonant transfer circuit is essentially the combined capacitance of $C_0$, $C_1$ and $C_2$, such elements as $L_1$ having too high an impedance to have any effect on the high frequency transfer operations. In other words, C is given by $$C=C_0+\frac{C_1C_2}{C_1+C_2} \quad (22)$$

If C is decreased to limit the transistor current this means that $n$ will have to be increased in order to still match the resistance R to that part of the filter impedance on the right-hand side of the transformer. Such an increase of $n$ means however that for a given power to be transmitted from E, the voltage applied to the transistor will be increased together with $n$. This is also a limiting condition since there is a maximum tolerable voltage for the transistor T. A compromise must therefore be sought and for example with a maximum energy level of 6 mw. and a resistance R of 600 ohms, a further step-up of 2 towards a transistor 2N1170 used for T was found satisfactory, therefore giving the overall step-up $n$ of Formula 21.

It is of interest to note that a symmetrical band-pass filter (not shown) also designed on an image parameter basis and in which the elements $L_3$ and $C_3$ are no longer present leads to a value for $L'_2$ corresponding to $L_2$ given by $$L'_2=\frac{abR}{2\pi f_m}\frac{m_o^2+m_1}{m_om_1} \quad (23)$$

which leads to much larger inductance than $L_2+L_3$ which will constitute the primary inductance, on the side of R of transformer TR (FIG. 1). Other drawbacks of such a symmetrical band-pass filter would be that without the elements $L_3$ and $C_3$ of FIG. 2 it cannot correspond to the structure of FIG. 1 involving physically realizable coupled inductances and a D.C. blocking capacitor. Hence, practical realization would inevitably bring in spurious elements, i.e. leakage inductance of the transformer and the D.C. blocking capacitor which can never be of ideally negligible impedances.

While the inductances $L_2$, $L_3$ and the ideal transformer of step-up ratio $n$ may be replaced by two inductively coupled physical coils, the values of $L_2$, $L_3$ and $n$ given by (13), (12) and (21) respectively, will not necessarily lead to a coupling coefficient $k$ very near unity as is the case for an ordinary transformer.

Hence one may consider transforming them into an ordinary transformer with a $k$ value close to unity plus a series coil of inductance $L_o$ on the secondary side connected to capacitor $C_2$.

These equivalent network elements are shown in FIG. 5 and the primary, secondary and mutual inductances $L_p$, $L_s$ and M of the coupled coils are given by $$L_p=L_2+L_3 \quad (24)$$

$$L_s=n^2L_2-L_o \quad (25)$$

$$M=nL_2=k\sqrt{L_pL_s} \quad (26)$$

and $L_o$ is a function of $k$, i.e.

$$\frac{L_o}{n^2L_2}=\frac{k^2L_3-(1-k^2)L_2}{k^2(L_2+L_3)} \quad (27)$$

which must of course be positive.

A practical design with $x_af_m=300$ c./s.

$x_bf_m=3400$ c./s.

$f_1=10{,}000$ c./s.

$R=600$ ohms $A_p=0.05$ neper $=0.434$ decibel leads to $f_m=1{,}010$ c./s.

$a=0.727$ from (8) and (6) respectively.

The normalized practical cut-off frequencies $x_a$ and $x_b$ as well as $b$ given by (9) are thus found to be $$x_a=\frac{300}{1,010}=0.297$$

$$x_b=\frac{3,400}{1,010}=3.37$$

$$b=3.62$$

In turn, $m_0$ is found to be $$m_0=3.87$$

from (4), while (10) gives $m_1$, i.e.

$$m_1=0.238$$

This means that all the basic parameters have now been calculated from the initial design values and from these, all the elements of the filter BPF of FIG. 2 can be computed, additional digits being of course determined for the parameters if a suitable accuracy is desired for the filter components:

$$C_0=26,800 \text{ pf.}$$

$$C_1=1,850 \text{ pf.}$$

$$C_2=29,500 \text{ pf.}$$

$$C_3=1.38 \mu\text{f.}$$

$$L_1=137 \text{ mh.}$$

$$L_p=352 \text{ mh.}$$

$$L_s=(1095-L_o) \text{ mh.}$$

$$M=605 \text{ mh.}$$

$$L_o=\frac{351.767\, k^2-333.781}{0.3211\, k^2} \text{ mh.}$$

The components $L_p$, $L_s$, M and $L_o$ of FIG. 5 have been indicated above instead of $L_2$, $L_3$ and $n$ of FIG. 2, since they are those which will be used in practice. The additional inductance $L_o$ has a value dependent on $k$, the transformer coupling coefficient, which would be 56 mh. if the transformer $L_p$, $L_s$, M had a $k$ value equal to unity and which becomes zero for $k=0.974$, thus the lowest $k$ value if $L_o$ is to be positive.

While $L_o$ represents an additional component it should be noted that it offers the possible advantage of isolating at high frequencies the resonant transfer storage capacitance C formed by $C_0$, $C_1$, $C_2$ from spurious capacitive elements such as the line capacitance. On the other hand, especially for large scale production it may be advantageous to design the transformer $L_p$, $L_s$, M with the special $k$ value mentioned above which enables to dispense with the extra inductive element.

The value of $L_p$ is much smaller than that which would be necessary if, as is usually the case, the transformer must try to approximate ideal conditions. This means that for an equal size the resistance of the windings will be much smaller thereby substantially reducing the transmission losses in the passband. The value of $L_p$ is also considerably smaller than that of $L'_2$ given by (23) which, for an equal size of the coil would lead to a winding resistance approximately 12 times greater.

FIG. 6 shows attenuation curves comparing the design of FIGS. 2 and 5 with one on the lines of FIG. 1 using a transformer of higher inductance value. The element values of the design on the lines of FIG. 1 are $$C_0=25,000 \text{ pf.}$$

$$C_1=2,380 \text{ pf.}$$

$$C_2=10,400 \text{ pf.}$$

$$C_3=2 \mu\text{f.}$$

$$L_1=106 \text{ mh.}$$

$$L_p=682 \text{ mh.}$$

$$L_s=2.52 \text{ h.}$$

The curves correspond to practical measurements on a time division multiplex connection such as shown in FIG. 1 and 1 represents the attenuation with the higher $L_p$ value while 2 shows that with the new design ($L_o$ is around 50 mh.). A much flatter passband response is secured together with higher attenuation and a much steeper transition between the pass and stop bands. The inductance of the transformer corresponding to response curve 2 is now small enough that a ferrite pot core could be used instead of Permalloy laminations, as well as a greater winding wire cross-section. Hence, this leads not only to a diminution of the winding resistance and of the losses but also to a cost price reduction.

Curves 3 and 4 (dashes) give the levels of the side band signals corresponding to curves 1 and 2 respectively. Energy is indeed contained not only in the 300 to 3,400 c./s. voice frequency band but also in all the side bands on the fundamenta and harmonics of the 10 kc./s. sampling frequency. In view of the substantial attenuation caused by the attenuation pole at 10 kc./s., only the lower side band on the fundamental need be considered, i.e. from 10,000−3,400=6,600 c./s. to 10,000−300=9,700 c./s. The curves 3 and 4 however translate these frequencies down to the voice frequency band. The improvement in side band suppression is seen to be considerable.

While the above design was on an image parameter basis, it is of course possible to design the filter structure of FIG. 2 on an insertion loss basis using classical techniques. Reference may for instance be made to Câbles et Transmission, July 1960, "Sur les filtres antimétriques en échelle," J. E. Colin and to Revue HF, No. 12, 1960, "Explicit formulae for the Calculation of the characteristic function of filters with Tchebycheff passband behavior," A. Fettweis. Using a computer programme, optimization of the element values may for instance be proceeded with in function of side band rejection.

Nearly 40 decibels can be secured at $$10,000-3,400=6,600 \text{ c./s.}$$

with a minimized shunt inductance value which is even lower than that obtained by using image parameter theory. The values of such an insertion loss design are $C_0=33,200$ pf.
$C_1=1,830$ pf.
$C_2=39,000$ pf.
$C_3=0.82$ $\mu$f.
$L_1=138$ mh.
$L_p=307$ mh.
$L_s=(718-L_o)$ mh.
M=443 mh.

$$L_o=\frac{306.7\, k^2-273.1}{0.427\, k^2} \text{ mh.}$$

As expected, these insertion loss design figures do not differ widely from those obtained by image parameter methods but the change is such as to make the transformer inductances even smaller thereby further reducing the attenuation in the pass-band.

The structure of an open circuit filter has been illustrated in relation to a seven-element antimetrical bandpass filter containing elements $C_0$, $C_1$, $C_2$, $C_3$, $L_1$, $L_2$ and $L_3$ plus an ideal transformer with a step-up ratio equal to $n$ and having inductances $L_2$ and $L_3$ realized by means of a physical transformer having two coupled physical coils with a coupling coefficient $k$ satisfying Formula 26. However, it is clear that modifications may be carried out while keeping to the spirit of the invention. For instance, if such a gating system is adopted that the sampling frequency leakage is much reduced, the attenuation pole at the sampling frequency could be omitted, saving capacitor $C_1$. The coils are however more important and accordingly a low leakage inductance transformer design enabling to dispense with $L_o$ will generally be found attractive.

While the principles of the invention have been described above in connection with specific apparatus, it is to be clearly understood that this description is made only by way of example and not as a limitation on the scope of the invention.

We claim:

1. An impedance network for an electrical transmission system wherein the signals are transmitted by means of pulses repeated at a sampling frequency, means for resistively terminating said network, coupled inductance means for coupling said impedance network on one side to said resistive termination, means for coupling said network on the other side to a gate regularly unblocked at said frequency wherein the improvement comprises said coupled inductance means including a shunt inductive impedance in the transmission path whose value at the lowest frequency to be transmitted and when measured on the side of said resistive termination is lower than three times the impedance of said resistive termination.

2. The impedance network of claim 1 wherein the value of said shunt inductive impedance at the lowest frequency to be transmitted is of the order of that of said resistive termination.

3. The impedance network of claim 1 and means wherein the maximum attenuation at the lowest frequency to be transmitted is substantially lower than that which would be created by said shunt inductive impedance when coupled between two matched resistive terminations.

4. The impedance network of claim 3 wherein said coupled inductance means on the side of said resistive termination is coupled thereto through a series capacitance.

5. The impedance network of claim 4 wherein the capacitance in series with said coupled inductance means is serially inserted between a first and a second part of said coupled inductance means.

6. The impedance network of claim 5 wherein said coupled inductance means with the series capacitance connected on the side of the resistive termination and said impedance network together constitute a band-pass filter.

7. The impedance network of claim 6 wherein said band-pass filter is antimetrical and comprises: a series resonant circuit on the side of said resistive termination, followed by a shunt anti-resonant circuit, by a series anti-resonant circuit and by a shunt capacitance coupled to said gate through a transformer.

8. The impedance network of claim 7 wherein said coupled inductance means comprise transformer means having a predetermined leakage inductance.

9. The impedance network of claim 8 wherein series inductance means are associated with said transformer means and located between said transformer means and the capacitance part of said shunt anti-resonant circuit.

References Cited

UNITED STATES PATENTS

| | | | |
|---|---|---|---|
| 2,081,861 | 5/1937 | Wheeler | 333—78 |
| 3,187,101 | 6/1965 | Broux et al. | 179—15 |

WILLIAM C. COOPER, Primary Examiner

ALBERT B. KIMBALL, Jr., Assistant Examiner

U.S. Cl. X.R.

307—240; 333—7, 20, 70, 77, 78